US010273394B2

(12) United States Patent
Okido et al.

(10) Patent No.: US 10,273,394 B2
(45) Date of Patent: Apr. 30, 2019

(54) REFRIGERATING MACHINE WORKING FLUID COMPOSITION AND REFRIGERANT OIL

(71) Applicant: JX NIPPON OIL & ENERGY CORPORATION, Tokyo (JP)

(72) Inventors: Takeshi Okido, Tokyo (JP); Masanori Saito, Tokyo (JP); Kuniko Adegawa, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 0 days.

(21) Appl. No.: 14/353,616

(22) PCT Filed: Oct. 25, 2012

(86) PCT No.: PCT/JP2012/077642
§ 371 (c)(1),
(2) Date: Apr. 23, 2014

(87) PCT Pub. No.: WO2013/062058
PCT Pub. Date: May 2, 2013

(65) Prior Publication Data
US 2015/0008358 A1 Jan. 8, 2015

(30) Foreign Application Priority Data
Oct. 26, 2011 (JP) ................. 2011-235130

(51) Int. Cl.
C09K 5/04 (2006.01)
C10M 171/00 (2006.01)
F25B 1/00 (2006.01)

(52) U.S. Cl.
CPC ......... *C09K 5/045* (2013.01); *C10M 171/008* (2013.01); *F25B 1/00* (2013.01); *C09K 2205/104* (2013.01); *C09K 2205/126* (2013.01); *C09K 2205/22* (2013.01); *C10M 2207/2835* (2013.01); *C10M 2209/043* (2013.01); *C10N 2220/022* (2013.01); *C10N 2220/302* (2013.01); *C10N 2230/10* (2013.01); *C10N 2230/70* (2013.01); *C10N 2240/30* (2013.01)

(58) Field of Classification Search
CPC .............. C09K 5/045; C09K 2205/126; C09K 2205/22; C09K 2205/122; C10M 2209/1055; C10M 2209/1045; C10M 2209/1085
See application file for complete search history.

(56) References Cited

U.S. PATENT DOCUMENTS

| 5,658,863 | A | 8/1997 | Duncan et al. |
| 5,705,459 | A | 1/1998 | Shiokawa et al. |
| 5,858,266 | A * | 1/1999 | Kaneko ................ C10M 125/24 252/68 |
| 6,261,472 | B1 | 7/2001 | Felix et al. |
| 6,783,691 | B1 * | 8/2004 | Bivens .................... C07C 19/08 252/67 |
| 8,163,689 | B2 | 4/2012 | Singh et al. |
| 8,449,789 | B2 | 5/2013 | Kaneko et al. |
| 8,454,853 | B2 | 6/2013 | Van Horn et al. |
| 9,303,900 | B2 | 4/2016 | Van Horn et al. |
| 9,365,760 | B2 | 6/2016 | Saito et al. |
| 2004/0089839 | A1 | 5/2004 | Thomas et al. |
| 2006/0128576 | A1 | 6/2006 | Tazaki |
| 2008/0075673 | A1 | 3/2008 | Knopeck et al. |
| 2010/0038582 | A1 | 2/2010 | Shimomura et al. |
| 2010/0038583 | A1 | 2/2010 | Shimomura et al. |
| 2010/0044619 | A1 * | 2/2010 | Hulse ...................... C09K 3/30 252/67 |
| 2010/0051854 | A1 | 3/2010 | Sawada et al. |
| 2010/0122545 | A1 | 5/2010 | Minor et al. |
| 2010/0123095 | A1 | 5/2010 | Minor et al. |
| 2010/0282999 | A1 * | 11/2010 | Shimomura ........... C09K 5/045 252/67 |
| 2011/0012052 | A1 | 1/2011 | Van Horn et al. |
| 2011/0057146 | A1 | 3/2011 | Kaneko et al. |
| 2011/0095224 | A1 | 4/2011 | Rached |
| 2011/0162410 | A1 | 7/2011 | Low |
| 2011/0240910 | A1 | 10/2011 | Carr et al. |
| 2011/0258146 | A1 | 10/2011 | Low |
| 2011/0258147 | A1 | 10/2011 | Low |

(Continued)

FOREIGN PATENT DOCUMENTS

| CN | 101945979 | 1/2011 |
| CN | 102191112 A | 9/2011 |

(Continued)

OTHER PUBLICATIONS

Extended European Search Report for EP Patent Application No. 12843876.9, dated Mar. 30, 2015.
Office Action for Chinese Patent Application No. 201280052794.5 dated Dec. 3, 2014.
English translation of the International Search Report for PCT/JP2012/077642, dated Dec. 25, 2012.
English translation of the International Preliminary Report on Patentability for PCT/JP2012/077642, dated May 8, 2014.
Office Action for Chinese Patent Application No. 201380013051.1, dated Jun. 25, 2015.
Extended European Search Report for EP Patent Application No. 13768396.7, dated Mar. 19, 2015.

(Continued)

*Primary Examiner* — John R Hardee
(74) *Attorney, Agent, or Firm* — Greenblum & Bernstein, P.L.C.

(57) ABSTRACT

A working fluid composition for a refrigerating machine of the invention comprises a refrigerant comprising difluoromethane and an unsaturated fluorinated hydrocarbon wherein a mass of the difluoromethane/the unsaturated fluorinated hydrocarbon is 95/5 to 10/90, and a refrigerating machine oil comprising at least one base oil selected from among polyol esters with a carbon/oxygen molar ratio of 3.2 to 5.8 and polyvinyl ethers with a carbon/oxygen molar ratio of 3.2 to 5.8.

20 Claims, No Drawings

(56) References Cited

U.S. PATENT DOCUMENTS

| | | |
|---|---|---|
| 2011/0260095 A1 | 10/2011 | Low |
| 2012/0024007 A1 | 2/2012 | Ota et al. |
| 2012/0108482 A1 | 5/2012 | Greaves et al. |
| 2012/0132848 A1* | 5/2012 | Sawada ............... C09K 5/045 252/68 |
| 2012/0298909 A1 | 11/2012 | Low |
| 2013/0012419 A1 | 1/2013 | Matsumoto |
| 2013/0012420 A1 | 1/2013 | Matsumoto |
| 2013/0096218 A1 | 4/2013 | Rached |
| 2014/0331697 A1 | 11/2014 | Minor |
| 2015/0028252 A1 | 1/2015 | Saito et al. |
| 2015/0041704 A1 | 2/2015 | Saito et al. |
| 2015/0147012 A1 | 5/2015 | Scancarello |
| 2016/0040094 A1 | 2/2016 | Kaneko et al. |
| 2017/0002291 A1 | 1/2017 | Takahashi et al. |

FOREIGN PATENT DOCUMENTS

| | | |
|---|---|---|
| CN | 102191113 A | 9/2011 |
| CN | 102191114 A | 9/2011 |
| CN | 102239228 | 11/2011 |
| EP | 1018538 | 7/2000 |
| EP | 2233553 | 9/2010 |
| EP | 2 551 333 | 1/2013 |
| EP | 2 551 334 | 1/2013 |
| EP | 2 832 836 | 3/2013 |
| JP | 06-145688 | 5/1994 |
| JP | H8-048990 A | 2/1996 |
| JP | 08-151587 | 6/1996 |
| JP | 10-265771 | 10/1998 |
| JP | 2000-044937 | 2/2000 |
| JP | 2000-274360 | 10/2000 |
| JP | 2006-503961 A | 2/2006 |
| JP | 2009-126979 | 6/2009 |
| JP | 2010-002074 | 1/2010 |
| JP | 2010-031728 | 2/2010 |
| JP | 2010-053252 | 3/2010 |
| JP | 2011-043276 | 3/2011 |
| JP | 2011-046885 | 3/2011 |
| JP | 2011085275 A | 4/2011 |
| JP | 2011162766 A | 8/2011 |
| JP | 2011-208068 * | 10/2011 |
| JP | 2011202032 A | 10/2011 |
| JP | 2011-256361 | 12/2011 |
| JP | 2012-031239 | 2/2012 |
| KR | 1020090076950 A | 7/2009 |
| KR | 10-2009-0130053 A | 12/2009 |
| KR | 1020100018546 A | 2/2010 |
| KR | 1020100091225 A | 8/2010 |
| KR | 1020100120145 A | 11/2010 |
| KR | 10-2011-0023764 A | 3/2011 |
| WO | 2004/037913 | 5/2004 |
| WO | 2005/105947 | 11/2005 |
| WO | 2009/057475 | 5/2009 |
| WO | 2010/047116 | 4/2010 |
| WO | 2010/059677 | 5/2010 |
| WO | 2010/064005 | 6/2010 |
| WO | 2010/129920 A1 | 11/2010 |
| WO | 2011/011656 | 1/2011 |
| WO | 2011/023923 | 3/2011 |
| WO | 2011/101622 | 8/2011 |
| WO | 2011/118732 | 9/2011 |
| WO | 2011/118733 | 9/2011 |
| WO | 2011/163117 | 12/2011 |

OTHER PUBLICATIONS

English translation of International Preliminary Report on Patentability for PCT/JP2013/059309, dated Oct. 9, 2014.
International Search Report of Patent Application No. PCT /JP2013/059309, dated Jun. 25, 2014; with an English Translation thereof.
Extended European Search Report for EP Patent Application No. 13768669.7, dated Mar. 25, 2015.
English translation of the International Preliminary Report of Patentability for application No. PCT/JP2013/058587, dated Oct. 9, 2014.
International Search Report of Patent Application No. PCT/JP2013/058587, dated Jun. 25, 2013; with an English Translation thereof.
European Search Report issued with respect to application No. 13767593.0, dated Mar. 18, 2015.
English translation of the International Preliminary Report of Patentability for WO Patent Application No. PCT/JP2013/059316, dated Oct. 9, 2014.
International Search Report of Patent Application No. PCT /JP2013/059316, dated Jul. 2, 2013; with an English Translation thereof.
Japanese Office Action issued with respect to application No. 2014-508042, dated Jan. 12, 2016.
Japanese Office Action issued with respect to application No. 2013-540830, dated Jan. 26, 2016.
Office Action issued with respect to U.S. Appl. No. 14/388,037, dated Mar. 17, 2016.
Office Action issued with respect to U.S. Appl. No. 14/387,298, dated Mar. 29, 2016.
Office Action issued in U.S. Appl. No. 14/388,037, dated Dec. 2, 2016.
Office Action issued in U.S. Appl. No. 14/387,298 dated Feb. 1, 2017.
Xie Quan, "Research and Application Guide of Lubricating Oil", Sinopec Press, Feb. 2007 (2nd Edition), pp. 302-303.
Gao Hongliang, "Application and Calculation of Refrigeration Properties of Green Alternative Refrigerants", The Yellow River Water Conservancy Press, Aug. 2005, pp. 62, 68-73.
Chinese Office Action in respect to Chinese Application No. 201380012190.2, dated Feb. 22, 2017.
Notice of Allowance in KR App. No. 10-2014-7027415 dated Mar. 28, 2018.
Notice of Allowance in KR App. No. 10-2014-7027434 dated Mar. 29, 2018.
Korean Office Action issued with respect to Korean Application No. 10-2018-7018484, dated Jul. 13, 2018.
Office Action in China Patent Application No. 201511000959.6, dated Mar. 5, 2018.
Office Action in China Patent Application No. 201511001457.5, dated Apr. 26, 2018.
Korean Notice of Allowance issued with respect to Korean Application No. 10-2018-7018484, dated Jul. 12, 2018.
Office Action issued in Korean Patent Application No. 10-2018-7029460 dated Oct. 23, 2018.
United States Office Action issued in respect to U.S. Appl. No. 14/387,079, dated Jul. 19, 2017.
Korean Office Action issued in respect to Application No. 10-2014-7027415 dated Oct. 25, 2017.

* cited by examiner

REFRIGERATING MACHINE WORKING FLUID COMPOSITION AND REFRIGERANT OIL

TECHNICAL FIELD

The present invention relates to a working fluid composition for a refrigerating machine and a refrigerating machine oil, and more specifically, it relates to a working fluid composition for a refrigerating machine containing a refrigerant composed mainly of a mixture of difluoromethane (also known as "HFC-32" or "R32") and an unsaturated fluorinated hydrocarbon, as well as a refrigerating machine oil used in the working fluid composition for a refrigerating machine.

BACKGROUND ART

In light of the problem of ozone layer depletion that is a focus of attention in recent years, the restrictions on CFCs (chlorofluorocarbons) and HCFCs (hydrochlorofluorocarbons) that are used as refrigerants in conventional refrigerating machines have become more stringent, and HFCs (hydrofluorocarbons) are coming into use as substitute refrigerants.

Among HFC refrigerants, HFC-134a, R407C and R410A are routinely used as refrigerants for automobile air conditioners, refrigerators and room air conditioners. However, while these HFC refrigerants have ozone depletion potentials (ODP) of zero, their high global warming potentials (GWP) have led to their gradual restriction. Difluoromethane has been studied as an alternative to such refrigerants, but its global warming potential is not sufficiently low, while its boiling point is too low and its thermodynamic properties cannot be directly applied to current refrigeration systems, and it is poorly compatible with lubricating oils (refrigerating machine oils) such as polyol esters or polyvinyl ethers used with conventional HFC refrigerants. On the other hand, unsaturated fluorinated hydrocarbons have very low ODP and GWP and may be noncombustible depending on the structure, and include HFO-1234yf which is equivalent or superior to HFC-134a in terms of thermodynamic properties, as a measure of refrigerant performance, and therefore its use as a refrigerant has been proposed (Patent Literatures 1 to 3).

CITATION LIST

Patent Literature

[Patent Literature 1] International Patent Publication No. WO2004/037913
[Patent Literature 2] International Patent Publication No. WO2005/105947
[Patent Literature 3] International Patent Publication No. WO2009/057475

SUMMARY OF INVENTION

Technical Problem

When a refrigerant and refrigerating machine oil are applied in a refrigeration system, the refrigerant must have thermodynamic properties suited for refrigeration systems, without adversely affecting the environment. In addition, with the co-presence of a refrigerant and a refrigerating machine oil, it is desirable that both mutually dissolve (compatibility), that the thermal/chemical stability is excellent, and that an oil film is maintained to minimize friction between sliding members (lubricity).

In refrigeration systems using unsaturated fluorinated hydrocarbons, refrigerating machine oils such as polyol esters or polyvinyl ethers used in HFCs exhibit compatibility with unsaturated fluorinated hydrocarbons, and therefore such refrigerating machine oils are considered suitable. Research by the present inventors, however, has shown that unsaturated fluorinated hydrocarbons have inferior thermal/chemical stability due to an unstable double bond in the molecule.

Furthermore, one reason for which compatibility between the refrigerant and refrigerating machine oil (hereunder also referred to simply as "compatibility") is desired is that in the refrigerant circulation cycle of a refrigerating machine, the refrigerating machine oil that lubricates the refrigerant compressor circulates in the cycle together with the refrigerant. That is, depending on selection of the refrigerating machine oil used in the refrigerant of a refrigerating machine, suitable compatibility between the refrigerant and refrigerating machine oil may not be obtained and refrigerating machine oil discharged from the refrigerant compressor may readily pool in the cycle. As a result, the amount of oil in the refrigerant compressor is reduced, causing problems such as friction due to poor lubrication, and occlusion of the expansion mechanism including the capillaries. Thus, selection of a refrigerating machine oil suitable for the refrigerant is essential. In a refrigeration system using difluoromethane, however, compatibility with the refrigerating machine oil is an issue, and the thermodynamic properties can be problematic.

The present invention has been accomplished in light of these circumstances, and it is an object thereof to provide a working fluid composition for a refrigerating machine and a refrigerating machine oil, that allow compatibility and thermal/chemical stability to be achieved in a refrigeration system using a refrigerant comprising difluoromethane and an unsaturated fluorinated hydrocarbon, without requiring major modifications to existing systems.

Solution to Problem

As a result of much diligent research directed toward achieving the object stated above, the present inventors have found that high levels of both sufficiently high compatibility and thermal/chemical stability can be achieved by using a refrigerant comprising difluoromethane and an unsaturated fluorinated hydrocarbon in a prescribed mass ratio, and a refrigerating machine oil comprising a specific ester or ether as the base oil, and the invention has been completed upon this finding.

In other words, the invention provides a working fluid composition for a refrigerating machine that comprises a refrigerant comprising difluoromethane and an unsaturated fluorinated hydrocarbon wherein the mass ratio of the difluoromethane/the unsaturated fluorinated hydrocarbon is 95/5 to 10/90, and a refrigerating machine oil comprising at least one base oil selected from among polyol esters with a carbon/oxygen molar ratio of 3.2 to 5.8 and polyvinyl ethers with a carbon/oxygen molar ratio of 3.2 to 5.8.

According to the invention, the total of the difluoromethane and the unsaturated fluorinated hydrocarbon in the refrigerant is preferably 80 mass % or greater.

Also, the mass ratio of the refrigerant/the refrigerating machine oil is preferably 90/10 to 30/70.

Furthermore, the mass ratio of the difluoromethane/the unsaturated fluorinated hydrocarbon is preferably 90/10 to 50/50.

The unsaturated fluorinated hydrocarbon is preferably fluoropropene.

When the base oil is a polyol ester with a carbon/oxygen molar ratio of 3.2 to 5.8, examples of preferred polyol esters include esters synthesized from a C4 to C9 fatty acid and a C4 to C12 polyhydric alcohol.

Also, when the base oil is a polyvinyl ether with a carbon/oxygen molar ratio of 3.2 to 5.8, examples of preferred polyvinyl ethers include polyvinyl ethers having a structural unit represented by the following formula (1).

[Chemical Formula 1]

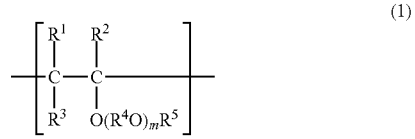

(1)

[In the formula, $R^1$, $R^2$ and $R^3$ may be the same or different and each represents hydrogen or a C1 to C8 hydrocarbon group, $R^4$ represents a C1 to C10 divalent hydrocarbon group or C2 to C20 divalent ether bonded oxygen-containing hydrocarbon group, $R^5$ represents a C1 to C20 hydrocarbon group, m represents a number such that the average value of m for the polyvinyl ether is 0 to 10, $R^1$ to $R^5$ may be the same or different for each structural unit, and when m is 2 or greater for one structural unit, the multiple $R^4O$ groups may be the same or different.]

The invention also provides a refrigerating machine oil, comprising at least one base oil selected from among polyol esters with a carbon/oxygen molar ratio of 3.2 to 5.8 and polyvinyl ethers with a carbon/oxygen molar ratio of 3.2 to 5.8, and being used together with a refrigerant that comprises difluoromethane and an unsaturated fluorinated hydrocarbon wherein a mass ratio of the difluoromethane/ the unsaturated fluorinated hydrocarbon is 95/5 to 10/90, Advantageous Effects of Invention According to the invention it is possible to provide a working fluid composition for a refrigerating machine and refrigerating machine oil, that allow compatibility and thermal/chemical stability to be achieved in a refrigeration system using a refrigerant comprising difluoromethane and an unsaturated fluorinated hydrocarbon, without requiring major modifications to existing systems.

DESCRIPTION OF EMBODIMENTS

Preferred embodiments of the invention is now described in detail.

[Working Fluid Composition for a Refrigerating Machine]

The working fluid composition for a refrigerating machine of this embodiment comprises a refrigerant comprising difluoromethane and an unsaturated fluorinated hydrocarbon wherein a mass ratio of the difluoromethane/ the unsaturated fluorinated hydrocarbon is 95/5 to 10/90, and a refrigerating machine oil comprising at least one base oil selected from among polyol esters with a carbon/oxygen molar ratio of 3.2 to 5.8 and polyvinyl ethers with a carbon/oxygen molar ratio of 12 to 5.8. In addition, the refrigerating machine oil of this embodiment comprises at least one base oil selected from among polyol esters with a carbon/oxygen molar ratio of 3.2 to 5.8 and polyvinyl ethers with a carbon/oxygen molar ratio of 3.2 to 5.8, and is used together with a refrigerant that comprises difluoromethane and an unsaturated fluorinated hydrocarbon wherein a mass ratio of the difluoromethane/the unsaturated fluorinated hydrocarbon is 95/5 to 10/90.

In the working fluid composition for a refrigerating machine of this embodiment, the mixing proportion between the refrigerant and refrigerating machine oil is not particularly restricted but the mass ratio of the refrigerant/the refrigerating machine oil is preferably 90/10 to 30/70 and more preferably 80/20 to 40/60.

The components in the working fluid composition for a refrigerating machine is now described.

[Refrigerant]

For this embodiment, the refrigerant is one containing difluoromethane and an unsaturated fluorinated hydrocarbon, with the blending ratio of the difluoromethane/the unsaturated fluorinated hydrocarbon being at a mass ratio of 95/5 to 10/90 and preferably 80/20 to 20/80. It is also preferably 90/10 to 50/50 and more preferably 90/10 to 60/40.

Difluoromethane (R32) by itself has a low boiling point and high pressure, and therefore cannot be considered to have favorable thermodynamic properties as a refrigerant. In addition, its global warming potential or GWP value is approximately 600, which is lower than the value of 1300 for the typical hydrofluorocarbon refrigerant HFC-134a but still not sufficiently low. It is also poorly compatible with refrigerating machine oils. However, its stability is satisfactory even in the copresence of refrigerating machine oils.

On the other hand, the thermodynamic properties of the unsaturated fluorinated hydrocarbon can be improved by selecting the type of unsaturated fluorinated hydrocarbon. The GWP value is very low, for example, 4 for HFO-1234yf. This is because of the double bond in the molecule that causes it to readily decompose in air.

The unsaturated fluorinated hydrocarbon also has suitable compatibility with refrigerating machine oils. Because it readily decomposes, however, its poor stability is a problem.

In this embodiment, therefore, mixing the difluoromethane and unsaturated fluorinated hydrocarbon in the proportion specified above compensates for the drawback of each refrigerant and accentuates its advantages for its suitable use as a refrigerant.

The unsaturated fluorinated hydrocarbon is preferably fluoropropene having 3 to 5 fluorine atoms, and it is preferably one or a mixture of two or more from among 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye) and 3,3,3-trifluoropropene (HFO-1243zf). From the viewpoint of refrigerant properties, it is preferred to use one or more selected from among HFO-1225ye, HFO-1234ze and HFO-1234yf.

The total of the difluoromethane and the unsaturated fluorinated hydrocarbon in the refrigerant is preferably 80 mass % or greater and more preferably 90 mass % or greater.

For this embodiment, the refrigerant may be one comprising difluoromethane and an unsaturated fluorinated hydrocarbon, and it may further comprise another refrigerant other than the difluoromethane and unsaturated fluorinated hydrocarbon. The refrigerants other than the difluoromethane and unsaturated fluorinated hydrocarbon include HFC refrigerants, fluorine ether-based refrigerants such as perfluoroethers, dimethyl ether, and natural refrigerants such as ammonia, propane and isobutane. The refrigerant is preferably an azeotropic mixture, but so long as it has the physical properties required for a refrigerant, it does not necessarily need to be an azeotropic mixture.

[Refrigerating Machine Oil]

The refrigerating machine oil of this embodiment comprises at least one base oil selected from among polyol esters with a carbon/oxygen molar ratio of 3.2 to 5.8 (hereunder also referred to simply as "polyol ester") and polyvinyl ethers with a carbon/oxygen molar ratio of 3.2 to 5.8 (hereunder also referred to simply as "polyvinyl ether"). The carbon/oxygen molar ratio can be calculated from the composition, if the chemical structure of the compounds composing the refrigerating machine oil is specified. Even if the chemical structure is not specified, organic elemental analysis of the refrigerating machine oil allows the content of carbon atoms and oxygen atoms to be quantified and specified.

The polyol ester of this embodiment is an ester synthesized from a polyhydric alcohol and a carboxylic acid, having a carbon/oxygen molar ratio of 3.2 to 5.8, preferably 3.2 to 5.0 and even more preferably 4.0 to 5.0.

The carboxylic acid composing the polyol ester is preferably a fatty acid (a monobasic aliphatic carboxylic acid) and especially a saturated fatty acid, preferably with 4 to 9 and especially 5 to 9 carbon atoms. The polyol ester of this embodiment may be a partial ester with a portion of the hydroxyl groups of the polyhydric alcohol remaining as hydroxyl groups without esterification, a complete ester with all of the hydroxyl groups esterified, or a mixture of the partial ester and the complete ester, but the hydroxyl value is preferably no greater than 10 mgKOH/g, more preferably no greater than 5 mgKOH/g and most preferably no greater than 3 mgKOH/g.

For the difluoromethane and unsaturated fluorinated hydrocarbon in the refrigerant, when the proportion of the difluoromethane that has poor compatibility with refrigerating machine oils is high, such as when the mass ratio of the difluoromethane/the unsaturated fluorinated hydrocarbon is 95/5 to 50/50, the proportion of branched fatty acids is preferably 50 to 100 mol %, especially 70 to 100 mol % and more preferably 90 to 100 mol % based on the total carboxylic acids. Specific C5 to C9 branched fatty acids include branched pentanoic acid, branched hexanoic acid, branched heptanoic acid, branched octanoic acid and branched nonanoic acid. More specifically, fatty acids branched at the α- and/or β-position are preferred, with 2-methylbutanoic acid, 2-methylpentanoic acid, 2-methylhexanoic acid, 2-ethylpentanoic acid, 2-methylheptanoic acid, 2-ethylhexanoic acid and 3,5,5-trimethylhexanoic acid being especially preferred and 2-ethylhexanoic acid and/or 3,5,5-trimethylhexanoic acid being most preferred. The carboxylic acids may also include fatty acids other than C5 to C9 branched fatty acids.

Also, for the difluoromethane and the unsaturated fluorinated hydrocarbon in the refrigerant, when the proportion of the unsaturated fluorinated hydrocarbon is greater than the difluoromethane it is easier to achieve compatibility with refrigerating machine oils, and therefore the proportion of straight-chain fatty acids among the fatty acids is preferably 50 to 95 mol %, especially 60 to 90 mol % and more preferably 70 to 85 mol %, based on the total carboxylic acids. Specific C5 to C9 straight-chain fatty acids include n-pentanoic acid, n-hexanoic acid, n-heptanoic acid, n-octanoic acid and n-nonanoic acid. Of these, n-pentanoic acid and/or n-heptanoic acid are most preferred, and especially a mixture of both. The n-pentanoic acid content is preferably at least 30 mol % based on the total carboxylic acids, particularly from the viewpoint of compatibility, while it is preferably no greater than 50 mol % and especially no greater than 45 mol %, particularly from the viewpoint of hydrolytic stability. The heptanoic acid content is preferably at least 20 mol %, especially at least 25 mol % and more preferably at least 30 mol %, based on the total carboxylic acid, from the viewpoint of lubricity. On the other hand, it is no greater than 50 mol % and preferably no greater than 45 mol % based on the total carboxylic acids, particularly from the viewpoint of hydrolytic stability. The carboxylic acids other than straight-chain fatty acids are preferably C5 to C9 branched fatty acids and especially 2-ethylhexanoic acid and/or 3,5,5-trimethylhexanoic acid. The content of 3,5,5-trimethylhexanoic acid is preferably 5 mol % or greater and especially 10 mol % or greater based on the total carboxylic acids, particularly from the viewpoint of hydrolytic stability, while it is also preferably no greater than 30 mol % and especially no greater than 25% based on the total carboxylic acids, particularly from the viewpoint of compatibility and lubricity.

A particularly preferred example of a combination of carboxylic acids is a mixture of n-pentanoic acid, n-heptanoic acid and 3,5,5-trimethylhexanoic acid. The proportion of each component in such an acid mixture is more preferably 30 to 50 mol % of n-pentanoic acid, 20 to 50 mol % of n-heptanoic acid and 5 to 30 mol % of 3,5,5-trimethylhexanoic acid based on the total acid mixture.

The polyhydric alcohol in the polyol ester is preferably a polyhydric alcohol with 2 to 6 hydroxyl groups. The number of carbon atoms of the polyhydric alcohol is preferably 4 to 12 and especially 5 to 10. Hindered alcohols such as neopentyl glycol, trimethylolethane, trimethylolpropane, trimethylolbutane, di-(trimethylolpropane), tri-(trimethylolpropane), pentaerythritol and di-(pentaerythritol) are preferred. Pentaerythritol or an ester mixture of pentaerythritol and di-(pentaerythritol) is most preferred, for particularly excellent compatibility with refrigerants and hydrolytic stability.

The polyvinyl ether for this embodiment has a carbon/oxygen molar ratio of 3.2 to 5.8, preferably 4.0 to 5.8 and even more preferably 4.0 to 5.0. If the molar ratio is below this range the hygroscopicity increases, and if it exceeds this range the compatibility is reduced. The weight-average molecular weight of the polyvinyl ether of the invention is preferably 200 to 3000, and especially 500 to 1500.

The polyvinyl ether to be preferably used for this embodiment has a structural unit represented by the following formula (1).

[Chemical Formula 2]

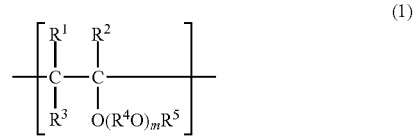

(1)

[In the formula, $R^1$, $R^2$ and $R^3$ may be the same or different and each represents hydrogen or a C1 to C8 hydrocarbon group, $R^4$ represents a C1 to C10 divalent hydrocarbon group or C2 to C20 divalent ether bonded oxygen-containing hydrocarbon group, $R^5$ represents a C1 to C20 hydrocarbon group, m represents a number such that the average value of m for the polyvinyl ether is 0 to 10, $R^1$ to $R^5$ may be the same or different for each structural unit, and when m is 2 or greater for one structural unit, the multiple $R^4O$ groups may be the same or different.]

Preferably, at least one of $R^1$, $R^2$ and $R^3$ in formula (1) is hydrogen and most preferably all are hydrogen. The value of m in formula (1) is 0 to 10, especially 0 to 5 and more preferably 0. Also, $R^5$ in formula (1) represents a C1 to C20 hydrocarbon group. The hydrocarbon group may be an alkyl, cycloalkyl, phenyl, aryl or arylalkyl group, with alkyl and especially C1 to C5 alkyl groups being especially preferred.

The polyvinyl ether for this embodiment may be a homopolymer having the same structural unit represented by formula (1) or a copolymer composed of two or more of such structural units, but a copolymer has an effect of satisfying the condition of compatibility while allowing further improvement in lubricity, insulation and hygroscopicity. Selection of the type of monomer serving as the starting material, the type of initiator and the ratio of the copolymer allow the target level to be achieved for performance of the lubricant. Thus, an effect is achieved by which it is possible to flexibly obtain a lubricant meeting the demands for lubricity and compatibility, that differ depending on the model of compressor in the refrigeration system or air-conditioning system, the material and refrigerating performance of the lubricating sections, and the type of refrigerant. The copolymer may be a block copolymer or random copolymer.

When the polyvinyl ether of the invention is a copolymer, the copolymer preferably comprises a structural unit (1-1) represented by formula (1) wherein $R^5$ is a C1 to C3 alkyl group, and a structural unit (1-2) represented by formula (1) wherein $R^5$ is a C3 to C20, preferably C3 to C10 and even more preferably C3 to C8 alkyl group. In the structural unit (1-1), $R^5$ is most preferably an ethyl group, and in the structural unit (1-2), $R^5$ is most preferably an isobutyl group. When the polyvinyl ether of the invention is a copolymer comprising the aforementioned structural units (1-1) and (1-2), the molar ratio of the structural unit (1-1)/the structural unit (1-2) is preferably 5/95 to 95/5, more preferably 20/80 to 90/10 and even more preferably 70/30 to 90/10. If the molar ratio is outside of this range, the compatibility with refrigerants is inadequate and the hygroscopicity tends to be increased.

The polyvinyl ether of the invention may be composed entirely of a structural unit represented by formula (1), or it may be a copolymer further comprising a structural unit represented by the following formula (2). In this case, the copolymer may be either a block copolymer or a random copolymer.

[Chemical Formula 3]

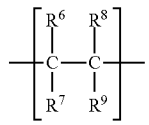

(2)

[In the formula, $R^6$ to $R^9$ may be the same or different from each other, with each representing hydrogen or a C1 to C20 hydrocarbon group.]

Polyvinyl ethers of the invention may be produced by polymerization of their corresponding vinyl ether-based monomers, and by copolymerization of corresponding hydrocarbon monomers having olefinic double bonds and vinyl ether-based monomers. Preferred vinyl ether-based monomers corresponding to the structural unit represented by formula (1) are monomers represented by the following formula (3).

[Chemical Formula 4]

(3)

[In the formula, $R^1$, $R^2$, $R^3$, $R^4$, $R^5$ and m each have the same definitions as $R^1$, $R^2$, $R^3$, $R^4$, $R^5$ and m in formula (1).]

The polyvinyl ether of the invention preferably has the following terminal structure.
(A) One end has a structure represented by formula (4) or (5), and the other end has a structure represented by formula (6) or (7).

[Chemical Formula 5]

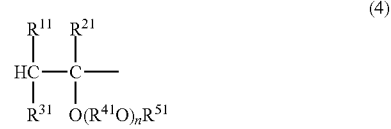

(4)

[In the formula, $R^{11}$, $R^{21}$ and $R^{31}$ may be the same or different from each other, with each representing hydrogen or a C1 to C8 hydrocarbon group, $R^{41}$ represents a C1 to C10 divalent hydrocarbon group or C2 to C20 divalent ether bonded oxygen-containing hydrocarbon group, $R^{51}$ represents a C1 to C20 hydrocarbon group, n represents a number such that the average value of n in the polyvinyl ether is 0 to 10, and when n is 2 or greater the multiple $R^{41}O$ groups may be the same or different.]

[Chemical Formula 6]

(5)

[In the formula, $R^{61}$, $R^{71}$, $R^{81}$ and $R^{91}$ may be the same or different from each other, and each represents hydrogen or a C1 to C20 hydrocarbon group.]

[Chemical Formula 7]

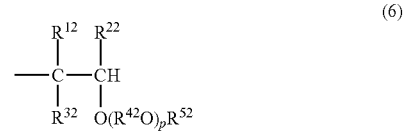

(6)

[In the formula, $R^{12}$, $R^{22}$ and $R^{32}$ may be the same or different from each other, with each representing hydrogen or a C1 to C8 hydrocarbon group, $R^{42}$ represents a C1 to C10 divalent hydrocarbon group or C2 to C20 divalent ether bonded oxygen-containing hydrocarbon group, $R^{52}$ represents a C1 to C20 hydrocarbon group, p represents a number such that the average value of p in the polyvinyl ether is 0 to 10, and when p is 2 or greater the multiple $R^{41}O$ groups may be the same or different.]

[Chemical Formula 8]

(7)

[In the formula, $R^{62}$, $R^{72}$, $R^{82}$ and $R^{92}$ may be the same or different from each other, and each represents hydrogen or a C1 to C20 hydrocarbon group.]
(B) One end has a structure represented by formula (4) or (5), and the other end has a structure represented by the following formula (8).

[Chemical Formula 9]

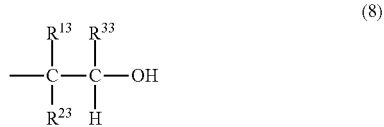

(8)

[In the formula, $R^{13}$, $R^{23}$ and $R^{33}$ may be the same or different from each other, and each represents hydrogen or a C1 to C8 hydrocarbon group.]

Among such polyvinyl ether-based compounds, the following are particularly preferred as main components of the refrigerating machine oil for this embodiment.
(1) Compounds wherein one end has a structure represented by formula (4) or (5) and the other end has a structure represented by formula (6) or (7), wherein $R^1$, $R^2$ and $R^3$ in formula (1) are both hydrogen, m is a number of 0 to 4, $R^4$ is a C2 to C4 divalent hydrocarbon group and $R^5$ is a C1 to C20 hydrocarbon group.
(2) Compounds having only a structural unit represented by formula (1), with one end having a structure represented by formula (4) and the other end having a structure represented by formula (6), wherein $R^1$, $R^2$ and $R^3$ in formula (1) are both hydrogen, m is a number of 0 to 4, $R^4$ is a C2 to C4 divalent hydrocarbon group and $R^5$ is a C1 to C20 hydrocarbon group.
(3) Compounds wherein one end has a structure represented by formula (4) or (5) and the other end has a structure represented by formula (8), and wherein $R^1$, $R^2$ and $R^3$ in formula (1) are both hydrogen, m is a number of 0 to 4, $R^4$ is a C2 to C4 divalent hydrocarbon group and $R^5$ is a C1 to C20 hydrocarbon group.
(4) Compounds having only a structural unit represented by formula (1), with one end having a structure represented by formula (5) and the other end having a structure represented by formula (8), wherein $R^1$, $R^2$ and $R^3$ in formula (1) are both hydrogen, m is a number of 0 to 4, $R^4$ is a C2 to C4 divalent hydrocarbon group, $R^5$ is a C1 to C20 divalent hydrocarbon group and $R^5$ is a C1 to C20 hydrocarbon group.
(5) Compounds of each of (1) to (4) above having a structural unit wherein $R^5$ in formula (1) is a C1 to C3 hydrocarbon group and a structural unit wherein $R^5$ is a C3 to C20 hydrocarbon group.

The polyvinyl ether of this embodiment can be produced by radical polymerization, cationic polymerization or radiation polymerization of the aforementioned monomers. Upon completion of the polymerization reaction, it is subjected to ordinary separation and purification methods as necessary to obtain the desired polyvinyl ether-based compound having a structural unit represented by formula (1).

The polyvinyl ether of this embodiment must have a carbon/oxygen molar ratio within a prescribed range as explained above, and adjusting the carbon/oxygen molar ratio of the starting monomers allows production of a polymer having the molar ratio within said range. Specifically, if the proportion of monomers with a high carbon/oxygen molar ratio is high, a polymer with a high carbon/oxygen molar ratio is obtained, and if the proportion of monomers with a low carbon/oxygen molar ratio is high, a polymer with a low carbon/oxygen molar ratio is obtained. By copolymerization of a vinyl ether-based monomer with a hydrocarbon monomer having an olefinic double bond, a polymer is obtained having a higher carbon/oxygen molar ratio than the carbon/oxygen molar ratio of the vinyl ether-based monomer, but this proportion can be adjusted by the ratio of hydrocarbon monomers with olefinic double bonds that are used, and their numbers of carbon atoms.

In the production steps for a polyvinyl ether having a structural unit represented by formula (1), secondary reactions sometimes occur forming unsaturated groups such as allyl groups in the molecule. When unsaturated groups are formed in the polyvinyl ether molecule, the thermostability of the polyvinyl ether itself is lowered and polymers are generated causing formation of sludge, or the resistance to oxidation (antioxidation) tends to be reduced, resulting in production of peroxides. Particularly when peroxides are produced, they decompose and generate carbonyl group-containing compounds, and the carbonyl group-containing compounds are a source of sludge that can cause capillary clogging. Consequently, the polyvinyl ether of this embodiment preferably has a low degree of unsaturation due to unsaturated groups and the like, and more specifically, a degree of unsaturation of no greater than 0.04 meq/g, more preferably no greater than 0.03 meq/g and even more preferably no greater than 0.02 meq/g. The peroxide number is preferably no greater than 10.0 meq/kg, more preferably no greater than 5.0 meq/kg and even more preferably no greater than 1.0 meq/kg. The carbonyl value is preferably no greater than 100 ppm by weight, more preferably no greater than 50 ppm by weight, and most preferably no greater than 20 ppm by weight.

The degree of unsaturation, peroxide number and carbonyl value according to the invention are the values measured according to the Standard Methods for the Analysis of Fats, Oils and Related Materials, established by the Japan Oil Chemists' Society. Specifically, the degree of unsaturation is the value (meq/g) obtained by reacting Wijs solution (ICl-acetic acid solution) with a sample, allowing the reaction mixture to stand in a dark area, subsequently reducing the excess ICl to iodine, titrating the iodine portion with sodium thiosulfate and calculating the iodine value, and then converting the iodine value to vinyl equivalents; the peroxide number is the value (meq/kg) obtained by adding potassium iodide to a sample, titrating the produced free iodine with sodium thiosulfate, and converting the free iodine to milliequivalents with respect to 1 kg of sample; and the carbonyl value is the value (ppm by weight) obtained by allowing 2,4-dinitrophenylhydrazine to act on a sample to produce colorable quinoid ion, measuring the absorbance of the sample at 480 nm, and converting it to carbonyl content based on a predetermined calibration curve with cinnamaldehyde as the standard substance. There are no particular restrictions on the hydroxyl value but it is preferably 10 mgKOH/g, more preferably 5 mgKOH/g and even more preferably 3 mgKOH/g.

The content of polyol ester or polyvinyl ether in the refrigerating machine oil is preferably a total of 80 mass % or greater and especially mass % or greater, for excellent lubricity, compatibility, thermal/chemical stability and electrical insulating properties. Base oils other than polyol esters and polyvinyl ethers that may be present in the refrigerating machine oil include hydrocarbon-based oils including mineral oils, olefin polymers, naphthalene compounds, alkylbenzenes and the like, and oxygen-containing synthetic oils such as polyglycols, ketones, polyphenyl ethers, silicones, polysiloxanes and perfluoroethers. Polyglycols and ketones are preferred as base oils to be used in combination with polyol esters and polyvinyl ethers.

The kinematic viscosity of the refrigerating machine oil of this embodiment is not particularly restricted, but the 40° C. kinematic viscosity is preferably 3 to 1000 mm$^2$/s, more preferably 4 to 500 mm$^2$/s and most preferably 5 to 400 mm$^2$/s. The 100° C. kinematic viscosity is preferably 1 to 100 mm$^2$/s and more preferably 2 to 50 mm$^2$/s. For the purpose of the invention, the kinematic viscosity is the kinematic viscosity measured according to JIS K 2283, "Crude Oil and Petroleum Products—Kinematic Viscosity Test Method and Viscosity Index Calculation Method".

The volume resistivity of the refrigerating machine oil of this embodiment is also not particularly restricted, but is preferably $1.0 \times 10^{11}$ Ω·cm or greater, more preferably $1.0 \times 10^{12}$ Ω·cm or greater and most preferably $1.0 \times 10^{13}$ Ω·cm or greater. High electrical insulating properties are usually required for use in sealed refrigerating machines. According to the invention, the volume resistivity is the value measured according to JIS C2101, "Electrical Insulation Oil Test Method", at 25° C.

The moisture content of the refrigerating machine oil of this embodiment is not particularly restricted but is preferably no greater than 200 ppm, more preferably no greater than 100 ppm and most preferably no greater than 50 ppm based on the total mass of the refrigerating machine oil. A lower moisture content is desired from the viewpoint of effect on the thermal/chemical stability and electrical insulating properties of the refrigerating machine oil, especially for use in a closed refrigerating machine.

The acid value of the refrigerating machine oil of this embodiment is also not particularly restricted, but in order to prevent corrosion of metals used in the refrigerating machine or pipings, and in order to prevent decomposition of the ester in the refrigerating machine oil of this embodiment, it is preferably no greater than 0.1 mgKOH/g and more preferably no greater than 0.05 mgKOH/g. According to the invention, the acid value is the value measured based on JIS K2501, "Petroleum Products And Lubricant Oils—Neutralization Value Test Method".

The ash content of the refrigerating machine oil of this embodiment is not particularly restricted, but in order to increase the thermal/chemical stability of the refrigerating machine oil of this embodiment and inhibit generation of sludge, it is preferably no greater than 100 ppm by mass and more preferably no greater than 50 ppm by mass. According to the invention, the ash content is the value measured based on JIS K2272, "Crude Oil/Petroleum Product Ash Content and Sulfated Ash Content Test Method".

If necessary, the refrigerating machine oil of this embodiment may be used in a form that further contains various additives. In the explanation which follows, the additive contents are given based on the total weight of the refrigerating machine oil composition, and the content of these components in the refrigerator fluid composition is preferably no greater than 5 mass % and especially no greater than 2 mass %, based on the total amount of the refrigerating machine oil composition.

In order to further enhance the abrasion resistance and load resistance of the working fluid composition for a refrigerating machine and the refrigerating machine oil of this embodiment, the working fluid composition for a refrigerating machine and the refrigerating machine oil may be added one or more phosphorus compounds selected from the group consisting of phosphoric acid esters, acidic phosphoric acid esters, thiophosphoric acid esters, acidic phosphoric acid ester amine salts, chlorinated phosphoric acid esters and phosphorous acid esters. These phosphorus compounds are esters of phosphoric acid or phosphorous acid with alkanols or polyether alcohols, or derivatives thereof.

In order to further improve the thermal/chemical stability of the working fluid composition for a refrigerating machine and refrigerating machine oil according to this embodiment, the working fluid composition for a refrigerating machine and the refrigerating machine oil may contain one or more epoxy compounds selected from among phenylglycidyl ether-type epoxy compounds, alkylglycidyl ether-type epoxy compounds, glycidyl ester-type epoxy compounds, allyloxirane compounds, alkyloxirane compounds, alicyclic epoxy compounds, epoxidated fatty acid monoesters and epoxidated vegetable oils.

The working fluid composition for a refrigerating machine and refrigerating machine oil of this embodiment may contain conventionally known additives for refrigerating machine oils as necessary, in order to further increase their performance. Examples of such additives include phenol-based antioxidants such as di-tert-butyl-p-cresol and bisphenol A, amine-based antioxidants such as phenyl-α-naphthylamine and N,N-di(2-naphthyl)-p-phenylenediamine, anti-wear agents such as zinc dithiophosphate, extreme-pressure agents such as chlorinated paraffins and sulfur compounds, oil agents such as fatty acids, silicone-based and other types of antifoaming agents, metal inactivating agents such as benzotriazoles, viscosity index improvers, pour point depressants, detergent dispersants and the like. Such additives may be used alone or in combinations of two or more.

The working fluid composition for a refrigerating machine and refrigerating machine oil of this embodiment is preferably used in a room air conditioner or refrigerator with a reciprocating or rotating closed compressor, or in an open or closed automobile air conditioner. The working fluid composition for a refrigerating machine and refrigerating machine oil according to this embodiment may also be suitably used in cooling devices of dehumidifiers, hot water suppliers, freezers, freezing/refrigerating warehouses, automatic vending machines, showcases, chemical plants and the like. The working fluid composition for a refrigerating machine and refrigerating machine oil according to this embodiment may also be suitably used in devices with centrifugal compressors.

EXAMPLES

The present invention is now explained in greater detail based on examples and comparative examples, with the understanding that these examples are in no way limitative on the invention.

[Refrigerating Machine Oil]

First, refrigerating machine oils 1 to 8 were prepared using the following base oils 1 to 8.

Base oil 8: Copolymer of ethylvinyl ether and isobutylvinyl ether (ethylvinyl ether/isobutylvinyl ether=7/1 (molar ratio), weight-average molecular weight: 910, carbon/oxygen molar ratio: 4.3). One terminal structure is represented by formula (4), with $R^{11}$, $R^{21}$ and $R^{31}$ representing hydrogen and $R^{51}$ representing an ethyl group, and n is 0. The other terminal structure is represented by formula (7), with $R^{62}$, $R^{72}$, $R^{82}$ and $R^{92}$ representing hydrogen.

The properties of the obtained refrigerating machine oils 1 to 8 are shown in Tables 1 and 2.

TABLE 1

|  | Refrigerating machine oil 1 | Refrigerating machine oil 2 | Refrigerating machine oil 3 | Refrigerating machine oil 4 |
| --- | --- | --- | --- | --- |
| Base oil | Base oil 1 | Base oil 2 | Base oil 3 | Base oil 4 |
| Carbon/oxygen molar ratio | 4.8 | 3.3 | 4.6 | 3.3 |
| 40° C. Kinematic viscosity [mm²/s] | 68.3 | 28.5 | 45.1 | 18.2 |
| 100° C. Kinematic viscosity [mm²/s] | 8.31 | 5.50 | 6.30 | 3.90 |
| Volume resistivity [Ω · cm] | $5 \times 10^{13}$ | $6 \times 10^{13}$ | $5 \times 10^{13}$ | $4 \times 10^{13}$ |
| Moisture content [ppm] | 45 | 56 | 53 | 58 |
| Acid value [mgKOH/g] | 0.01 | 0.01 | 0.01 | 0.01 |
| Hydroxyl value [mgKOH/g] | 2.1 | 1.8 | 1.7 | 2.0 |
| Ash [mass ppm] | 0.1 | 0.1 | 0.1 | 0.1 |

TABLE 2

|  | Refrigerating machine oil 5 | Refrigerating machine oil 6 | Refrigerating machine oil 7 | Refrigerating machine oil 8 |
| --- | --- | --- | --- | --- |
| Base oil | Base oil 5 | Base oil 6 | Base oil 7 | Base oil 8 |
| Carbon/oxygen molar ratio | 4.6 | 5.5 | 5.1 | 4.3 |
| 40° C. Kinematic viscosity [mm²/s] | 67.5 | 51.5 | 110.8 | 66.4 |
| 100° C. Kinematic viscosity [mm²/s] | 8.20 | 7.10 | 11.0 | 8.15 |
| Volume resistivity [Ω · cm] | $6 \times 10^{13}$ | $5 \times 10^{13}$ | $7 \times 10^{13}$ | $9 \times 10^{13}$ |
| Moisture content [ppm] | 61 | 47 | 55 | 87 |
| Acid value [mgKOH/g] | 0.01 | 0.01 | 0.01 | 0.01 |
| Hydroxyl value [mgKOH/g] | 1.6 | 2.2 | 1.8 | 1.5 |
| Ash [mass ppm] | 0.1 | 0.1 | 0.1 | 0.1 |

[Base Oil]

Base oil 1: Ester of fatty acid mixture of 2-ethylhexanoic acid and 3,5,5-trimethylhexanoic acid (mixing ratio (molar ratio): 50/50) and pentaerythritol (carbon/oxygen molar ratio: 4.8).

Base oil 2: Ester of fatty acid mixture of n-pentanoic acid, n-heptanoic acid and 3,5,5-trimethylhexanoic acid (mixing ratio (molar ratio): 40/40/20) and pentaerythritol (carbon/oxygen molar ratio: 3.3).

Base oil 3: Ester of 2-ethylhexanoic acid and pentaerythritol (carbon/oxygen molar ratio: 4.6).

Base oil 4: Ester of fatty acid mixture of n-pentanoic acid and 3,5,5-trimethylhexanoic acid (mixing ratio (molar ratio): 90/10) and pentaerythritol (carbon/oxygen molar ratio: 3.3).

Base oil 5: Ester of fatty acid mixture of n-pentanoic acid and 3,5,5-trimethylhexanoic acid (mixing ratio (molar ratio): 25/75) and pentaerythritol (carbon/oxygen molar ratio: 4.6).

Base oil 6: Ester of 3,5,5-trimethylhexanoic acid and trimethylolpropane (carbon/oxygen molar ratio: 5.5).

Base oil 7: Ester of 3,5,5-trimethylhexanoic acid and pentaerythritol (carbon/oxygen molar ratio: 5.1).

Examples 1 to 17

Comparative Examples 1 to 6

For Examples 1 to 17 and Comparative Examples 1 to 6, the following evaluation test was carried out with working fluid compositions for a refrigerating machine that were combinations of refrigerating machine oils 1 to 8 above and the refrigerants listed in Tables 3 to 6. As explained below, the mass ratio of the refrigerant and refrigerating machine oil in the working fluid composition for a refrigerating machine was changed for each test.

[Compatibility Evaluation]

The refrigerating machine oil was added at 2 g with respect to 18 g of each of the different refrigerants listed in Tables 3 to 6, according to JIS-K-2211, "Refrigerating machine oils", "Refrigerant compatibility test method", to produce working fluid compositions for a refrigerating machine. Next, each composition was observed to determine whether or not the refrigerant and refrigerating machine oil had mutually dissolved at 0° C. The obtained results are shown in Tables 3 to 6. In Tables 3 to 6, "compatible" means that the refrigerant and refrigerating machine oil had mutually dissolved, "separated" means that the refrigerant and refrigerating machine oil had separated into two layers, and "somewhat turbid" means that they had mutually dissolved but turbidity was visible with the naked eye.

[Thermal/Chemical Stability Evaluation]

Following the procedure of JIS-K-2211, a catalyst (iron, copper or aluminum wire) was placed in a glass tube, and 1 g of refrigerating machine oil (initial color hue: L0.5) adjusted to a moisture content of no greater than 100 ppm and 1 g of a refrigerant as shown in Tables 3 to 6 were further added to prepare a working fluid composition for a refrigerating machine. The glass tube was sealed and then heated to 150° C. and stored for 1 week. Next, the color tone of the refrigerating machine oil and the change in catalyst color were evaluated. The color tone was evaluated according to ASTM D156. The change in catalyst color was determined by visual observation of the outer appearance, and evaluation was made as "no change", "no gloss" or "blackening". The obtained results are shown in Tables 3 to 6.

TABLE 3

|  |  | Example 1 | Example 2 | Example 3 | Example 4 | Comp. Ex. 1 | Comp. Ex. 2 | Comp. Ex. 3 |
|---|---|---|---|---|---|---|---|---|
| Refrigerating machine oil |  | Refrigerating machine oil 1 | Refrigerating machine oil 1 | Refrigerating machine oil 1 | Refrigerating machine oil 1 | Refrigerating machine oil 1 | Refrigerating machine oil 1 | Refrigerating machine oil 1 |
| Refrigerant | R32 [mass %] | 75 | 50 | 25 | 90 | 100 | — | — |
|  | HFO-1234yf [mass %] | 25 | 50 | 75 | 10 | — | 100 | — |
|  | R410A [mass %] | — | — | — | — | — | — | 100 |
|  | GWP | 490 | 330 | 170 | 590 | 650 | 4 | 1730 |
| Compatibility |  | Compatible | Compatible | Compatible | Somewhat turbid | Separated | Compatible | Compatible |
| Thermal/chemical stability | Color tone (ASTM D156) | L0.5 | L0.5 | L0.5 | L0.5 | L0.5 | L0.5 | L0.5 |
|  | Catalyst outer appearance Cu | No change | No change | No change | No change | No change | No gloss | No change |
|  | Catalyst outer appearance Fe | No change | No change | No change | No change | No change | No gloss | No change |
|  | Catalyst outer appearance Al | No change | No change | No change | No change | No change | No change | No change |

TABLE 4

|  |  | Example 5 | Example 6 | Example 7 | Example 8 | Comp. Ex. 4 | Comp. Ex. 5 | Comp. Ex. 6 |
|---|---|---|---|---|---|---|---|---|
| Refrigerating machine oil |  | Refrigerating machine oil 2 | Refrigerating machine oil 2 | Refrigerating machine oil 2 | Refrigerating machine oil 2 | Refrigerating machine oil 2 | Refrigerating machine oil 2 | Refrigerating machine oil 2 |
| Refrigerant | R32 [mass %] | 75 | 50 | 25 | 90 | 100 | — | — |
|  | HFO-1234yf [mass %] | 25 | 50 | 75 | 10 | — | 100 | — |
|  | R410A [mass %] | — | — | — | — | — | — | 100 |
|  | GWP | 490 | 330 | 170 | 590 | 650 | 4 | 1730 |
| Compatibility |  | Compatible | Compatible | Compatible | Somewhat turbid | Separated | Compatible | Compatible |
| Thermal/chemical stability | Color tone (ASTM D156) | L0.5 | L0.5 | L0.5 | L0.5 | L0.5 | L0.5 | L0.5 |
|  | Catalyst outer appearance Cu | No change | No change | No change | No change | No change | No gloss | No change |
|  | Catalyst outer appearance Fe | No change | No change | No change | No change | No change | No gloss | No change |
|  | Catalyst outer appearance Al | No change | No change | No change | No change | No change | No change | No change |

TABLE 5

|  |  | Example 9 | Example 10 | Example 11 | Example 12 | Example 13 | Example 14 |
|---|---|---|---|---|---|---|---|
| Refrigerating machine oil |  | Refrigerating machine oil 3 | Refrigerating machine oil 4 | Refrigerating machine oil 5 | Refrigerating machine oil 5 | Refrigerating machine oil 6 | Refrigerating machine oil 7 |
| Refrigerant | R32 [mass %] | 75 | 50 | 25 | 90 | 75 | 50 |
|  | HFO-1234yf [mass %] | 25 | 50 | 75 | 10 | 25 | 50 |
|  | R410A [mass %] | — | — | — | — | — | — |
|  | GWP | 490 | 330 | 170 | 590 | 490 | 330 |
| Compatibility |  | Compatible | Compatible | Compatible | Somewhat turbid | Compatible | Separated |
| Thermal/chemical stability | Color tone (ASTM D156) | L0.5 | L0.5 | L0.5 | L0.5 | L0.5 | L0.5 |
|  | Catalyst outer appearance Cu | No change | No change | No change | No change | No change | No change |
|  | Catalyst outer appearance Fe | No change | No change | No change | No change | No change | No change |
|  | Catalyst outer appearance Al | No change | No change | No change | No change | No change | No change |

TABLE 6

|  |  | Example 15 | Example 16 | Example 17 | Comp. Ex. 7 | Comp. Ex. 8 | Comp. Ex. 9 |
|---|---|---|---|---|---|---|---|
| Refrigerating machine oil |  | Refrigerating machine oil 8 | Refrigerating machine oil 8 | Refrigerating machine oil 8 | Refrigerating machine oil 8 | Refrigerating machine oil 8 | Refrigerating machine oil 8 |
| Refrigerant | R32 [mass %] | 75 | 50 | 25 | 100 | — | — |
|  | HFO-1234yf [mass %] | 25 | 50 | 75 | — | 100 | — |
|  | R410A [mass %] | — | — | — | — | — | 100 |
|  | GWP | 490 | 330 | 170 | 650 | 4 | 1730 |

TABLE 6-continued

|  |  | Example 15 | Example 16 | Example 17 | Comp. Ex. 7 | Comp. Ex. 8 | Comp. Ex. 9 |
|---|---|---|---|---|---|---|---|
| Compatibility |  | Compatible | Compatible | Compatible | Separated | Compatible | Compatible |
| Thermal/ | Color tone (ASTM D156) | L0.5 | L0.5 | L0.5 | L0.5 | L0.5 | L0.5 |
| chemical | Catalyst outer appearance Cu | No change | No change | No change | No change | No gloss | No change |
| stability | Catalyst outer appearance Fe | No change | No change | No change | No change | No gloss | No change |
|  | Catalyst outer appearance Al | No change | No change | No change | No change | No change | No change |

INDUSTRIAL APPLICABILITY

The present invention is useful as a working fluid composition and a refrigerating machine oil to be used in a refrigeration system employing a refrigerant comprising difluoromethane and an unsaturated fluorinated hydrocarbon.

The invention claimed is:

1. A working fluid composition for a refrigerating machine consisting of a refrigerant and a refrigerating machine oil,
the refrigerant comprising difluoromethane and an unsaturated fluorinated hydrocarbon wherein a mass ratio of the difluoromethane/the unsaturated fluorinated hydrocarbon is 95/5 to 10/90, wherein the refrigerant does not have a mass ratio of the difluoromethane/the unsaturated fluorinated hydrocarbon of 50/50, and
the refrigerating machine oil consisting of a base oil and an additive, wherein the base oil is at least one base oil selected from among
polyol esters with a carbon/oxygen molar ratio of 3.2 to 5.8;
wherein
the polyol ester is an ester synthesized from a polyhydric alcohol comprising pentaerythritol and a fatty acid blend, wherein the fatty acid blend consists of
a straight-chain fatty acid and
at least one branched fatty acid selected from the group consisting of 2-methylbutanoic acid, 2-methylpentanoic acid, 2-methylhexanoic acid, 2-ethylpentanoic acid, 2-methylheptanoic acid, 2-ethylhexanoic acid, and 3,5,5-trimethylhexanoic acid, and wherein
the proportion of the straight-chain fatty acid is 80 to 90 mol % based on the total mass of the fatty acid blend.

2. The working fluid composition for a refrigerating machine according to claim 1, wherein the total of the difluoromethane and the unsaturated fluorinated hydrocarbon in the refrigerant is 80 mass % or greater.

3. The working fluid composition for a refrigerating machine according to claim 1, wherein the mass ratio of the refrigerant/the refrigerating machine oil is 90/10 to 30/70.

4. The working fluid composition for a refrigerating machine according to claim 1, wherein the mass ratio of the difluoromethane/the unsaturated fluorinated hydrocarbon is 90/10 to 50/50, wherein the refrigerant does not have a mass ratio of the difluoromethane/the unsaturated fluorinated hydrocarbon of 50/50.

5. The working fluid composition for a refrigerating machine according to claim 1, wherein the unsaturated fluorinated hydrocarbon is a fluoropropene.

6. The working fluid composition for a refrigerating machine according to claim 1, wherein the base oil is a polyol ester with a carbon/oxygen molar ratio of 3.2 to 5.0.

7. The working fluid composition for a refrigerating machine of claim 1,
wherein the additive is one or more selected from the group consisting of phosphorus compounds, epoxy compounds, phenol-based antioxidants, amine-based antioxidants, anti-wear agents, extreme-pressure agents, oil agents, antifoaming agents, metal inactivating agents, viscosity index improvers, pour point depressants, and detergent dispersants.

8. The working fluid composition for a refrigerating machine according to claim 1, wherein the mass ratio of (the difluoromethane)/(the unsaturated fluorinated hydrocarbon) is 75/25 to 25/75.

9. The working fluid composition for a refrigerating machine according to claim 1, wherein the fatty acid is a mixture of
30 to 50 mol % of n-pentanoic acid,
20 to 50 mol % of n-heptanoic acid and
5 to 20 mol % of 3,3,5-trimethylhexanoic acid, based on the total fatty acid.

10. The working fluid composition for a refrigerating machine according to claim 1,
wherein the unsaturated fluorinated hydrocarbon consists of 1,2,3,3,3-pentafluoropropene, 1,3,3,3-tetrafluoropropene, 2,3,3,3-tetrafluoropropene, 1,2,3,3-tetrafluoropropene, 3,3,3-trifluoropropene, or a mixture thereof.

11. The working fluid composition for a refrigerating machine according to claim 10,
wherein the total of the difluoromethane and the unsaturated fluorinated hydrocarbon in the refrigerant is 80 mass % or greater.

12. The working fluid composition for a refrigerating machine according to claim 10,
wherein the mass ratio of (the refrigerant)/(the refrigerating machine oil) is 90/10 to 30/70.

13. The working fluid composition for a refrigerating machine according to claim 10, wherein the mass ratio of (the difluoromethane)/(the unsaturated fluorinated hydrocarbon) is 90/10 to 50/50, wherein the refrigerant does not have a mass ratio of the difluoromethane/the unsaturated fluorinated hydrocarbon of 50/50.

14. The working fluid composition for a refrigerating machine according to claim 10, wherein the additive is one or more selected from the group consisting of phosphorus compounds, epoxy compounds, phenol-based antioxidants, amine-based antioxidants, anti-wear agents, extreme-pressure agents, antifoaming agents, metal inactivating agents, viscosity index improvers, pour point depressants, and detergent dispersants.

15. The working fluid composition for a refrigerating machine according to claim 10, wherein the fatty acid is a mixture of
30 to 50 mol % of n-pentanoic acid,
20 to 50 mol % of n-heptanoic acid and
5 to 20 mol % of 3,3,5-trimethylhexanoic acid, based on the total fatty acid.

16. A working fluid composition for a refrigerating machine consisting of a refrigerant and a refrigerating machine oil, the refrigerant comprising difluoromethane and an unsaturated fluorinated hydrocarbon consisting of 1,2,3,3,3-pentafluoropropene (HFO-1225ye), 1,3,3,3-tetrafluoropropene (HFO-1234ze), 2,3,3,3-tetrafluoropropene (HFO-1234yf), 1,2,3,3-tetrafluoropropene (HFO-1234ye), 3,3,3-trifluoropropene (HFO-1243zf) or a mixture thereof, wherein a mass ratio of the difluoromethane/the unsaturated fluorinated hydrocarbon is 95/5 to 10/90, and the refrigerating machine oil consisting of a base oil and an additive, wherein the base oil is at least one base oil selected from among polyol esters with a carbon/oxygen molar ratio of 3.2 to 5.8;

wherein the polyol ester is synthesized from a polyhydric alcohol comprising pentaerythritol, and a fatty acid comprising a straight-chain fatty acid and a branched fatty acid comprising 3,5,5-trimethylhexanoic acid, and wherein the proportion of the branched fatty acid is 20 mol % or less, and the proportion of the straight-chain fatty acid is 80 mol % or greater, based on the total mass of the fatty acid blend.

17. The working fluid composition for a refrigerating machine according to claim 16, wherein the mass ratio of the difluoromethane/the unsaturated fluorinated hydrocarbon is 90/10 to 50/50.

18. The working fluid composition for a refrigerating machine according to claim 16, wherein the additive is one or more selected from the group consisting of phosphorus compounds, epoxy compounds, phenol-based antioxidants, amine-based antioxidants, anti-wear agents, extreme-pressure agents, antifoaming agents, metal inactivating agents, viscosity index improvers, pour point depressants, and detergent dispersants.

19. The working fluid composition for a refrigerating machine according to claim 16, wherein the fatty acid is a mixture of 30 to 50 mol % of n-pentanoic acid, 30 to 50 mol % of n-heptanoic acid and 5 to 20 mol % of 3,3,5-trimethylhexanoic acid based on the total acid mixture.

20. The working fluid composition for a refrigerating machine according to claim 16, wherein the total of the difluoromethane and the unsaturated fluorinated hydrocarbon in the refrigerant is 80 mass % or greater.

* * * * *